United States Patent [19]

Spotts

[11] Patent Number: 4,842,308
[45] Date of Patent: Jun. 27, 1989

[54] ROTATION LIMITING BALL-JOINT CONDUIT APPARATUS

[75] Inventor: James C. Spotts, Kowloon, Hong Kong

[73] Assignee: Australux North America Limited, Inverness, Ill.

[21] Appl. No.: 210,230

[22] Filed: Jun. 23, 1988

[51] Int. Cl.⁴ .............................................. F16L 27/04
[52] U.S. Cl. ..................................... 285/261; 285/282; 285/907
[58] Field of Search ............... 285/907, 264, 261, 282; 403/138, 116, 117

[56] References Cited

U.S. PATENT DOCUMENTS

| | | | |
|---|---|---|---|
| 823,000 | 6/1906 | Snowhill | 285/261 |
| 2,859,983 | 11/1958 | May | 285/907 |
| 3,033,596 | 5/1962 | Dearring | 285/261 |
| 3,034,809 | 5/1962 | Greenberg | 285/907 |
| 3,104,897 | 9/1963 | Berger | 403/138 |
| 3,312,482 | 4/1967 | Barrett et al. | 285/264 |
| 4,322,098 | 3/1982 | Warshawsky | 285/907 |

FOREIGN PATENT DOCUMENTS 2448426  4/1975  Fed. Rep. of Germany ...... 285/261

*Primary Examiner*—Randolph A. Reese
*Assistant Examiner*—Anthony Knight
*Attorney, Agent, or Firm*—Wallenstein, Wagner & Hattis, Ltd.

[57] ABSTRACT

A limited rotation ball-joint conduit apparatus for the adjustable mounting and electrical connection of an electrical fixture to a fixed service mount. The ball member of the present invention has a flat surface. The socket member of the present invention has an indexing pin extending into the socket above the flat surface of the ball member. The indexing pin is located so that the indexing pin engages only upon a point along a periphery of the flat surface of the ball member when the spherical flange is rotated; thus preventing further rotation in that direction.

6 Claims, 2 Drawing Sheets

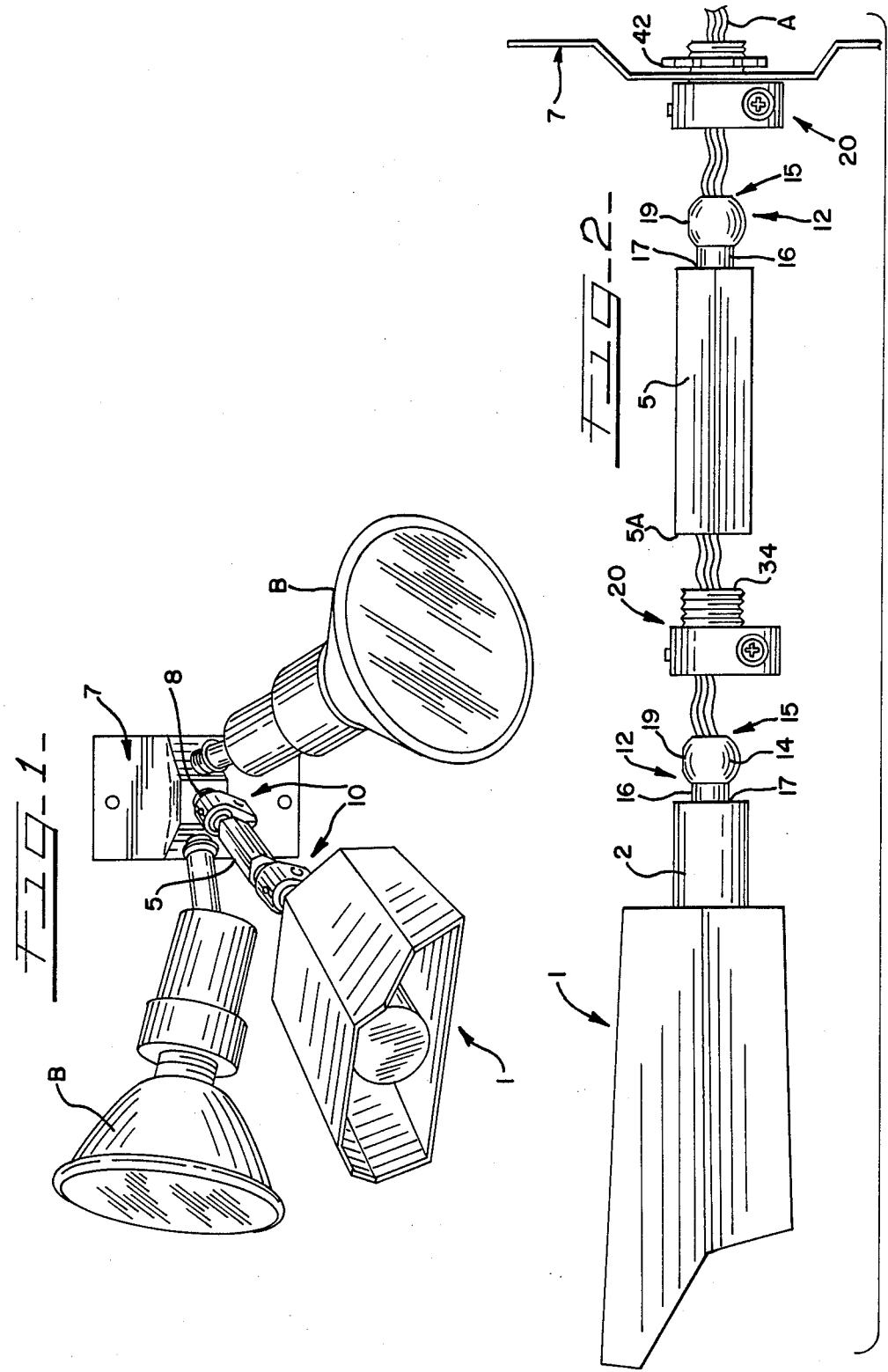

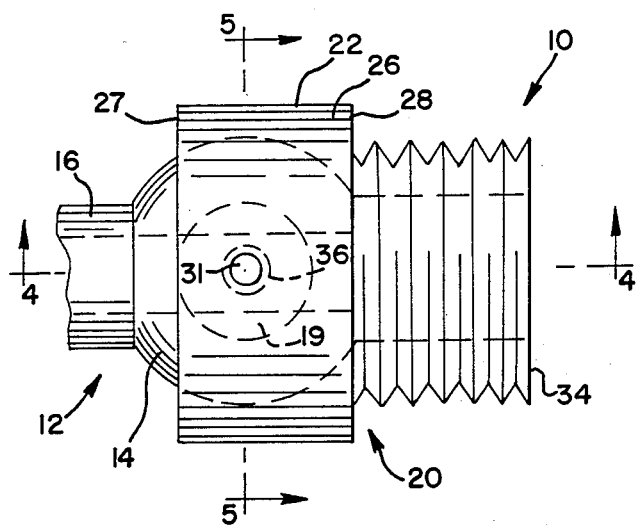
FIG-3-
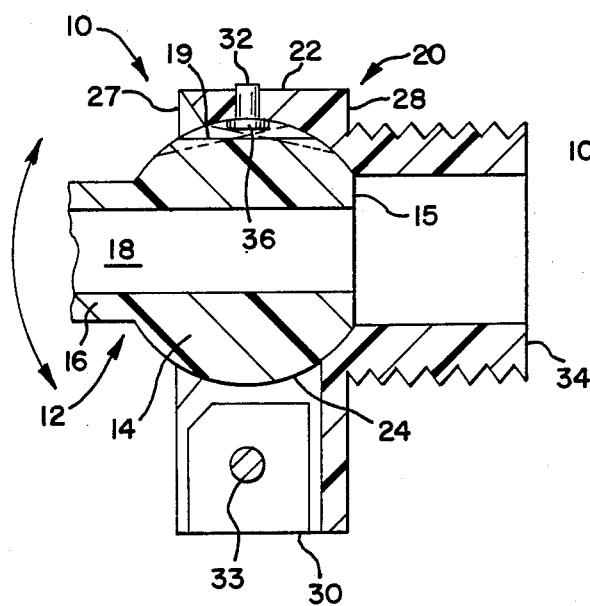
FIG-4-
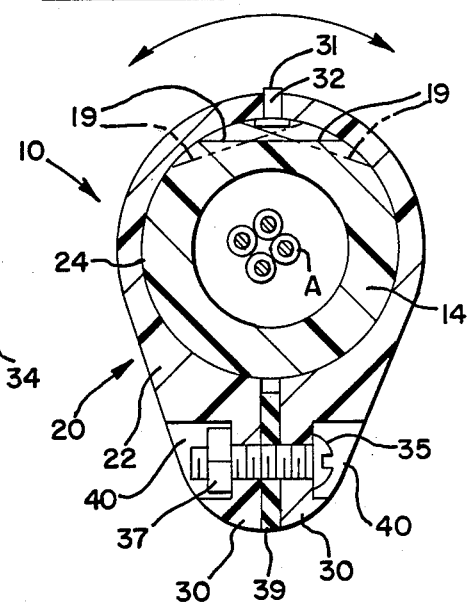
FIG-5-

ROTATION LIMITING BALL-JOINT CONDUIT APPARATUS

DESCRIPTION

1. Technical Field

The present invention relates generally to hollow ball-joint mounting apparatus for electrical fixtures and particularly to ball-joint rotation limiters used therein.

2. Backoround of the Invention

In many circumstances it is desirable to have a means to adjust the attitude of an electrical fixture once it is installed. For example, to adjust the direction of a spot light or a sensing device.

An apparatus which achieves this desired adjustability is a ball-joint which connects an electrical fixture to a fixed mounting surface. The ball-joint configuration is hollow to allow passage of electrical wires from a source to the fixture through the ball-joint. Thus the ball-joint is a conduit apparatus allowing continuous attitude adjustment of an electrical fixture.

Problems arise when, during use, a given fixture accumulates many rotational adjustments all in the same direction. Under those circumstances, the electrical wires can become so twisted as to break connections or wear through the wire insulation causing malfunction and possibly short circuiting.

Thus, prior to the development of the present invention, a need existed for a ball-joint mounting connector which is configured in such a way so as to allow electrical fixture attitude adjustment while limiting fixture rotational adjustment.

SUMMARY OF THE INVENTION

The broad aspect of present invention relates to the provision of a balljoint conduit apparatus for the connection of an electrical fixture to a fixed service mount whereby the ball-joint allows attitude adjustment of the fixture but limits fixture rotational adjustment to less than one complete rotation.

In a preferred embodiment of the present invention a C-shaped collar with an attached threaded flange is demountably threaded into a fixed service mount. The C-shaped collar has a semi-spherically concave inner surface which is adapted to receive a ball member forming a ball-joint. The ball member is attached to an electrical fixture.

The ball member has a flat surface which is indexed by a pin extending from the inner surface of the C-shaped collar. The pin extends to a point above the flat surface and is located so that it will only engage upon a point along the periphery of the flat surface during fixture rotation in any direction. Thus, a fixture connected to the ball member can only be rotated in a given direction until the indexing pin engages a periphery of the flat surface.

Other advantages and aspects of the invention will become apparent upon making reference to the specification, claims, and drawings to follow.

BRIEF DESCRIPTION OF THE DRAWINGS

FIG. 1 is a perspective view of the ball-joint conduit apparatus of the present invention as used with an infrared motion sensor.

FIG. 2 is an exploded side view of the ball-joint conduit apparatus of the present invention as used with an infrared motion sensor.

FIG. 3 is a top view of the ball-joint conduit apparatus of the present invention.

FIG. 4 is a cross sectional view of the ball-joint conduit apparatus of the present invention taken along line 4—4 of FIG. 3.

FIG. 5 is a cross sectional end view of the ball-joint conduit apparatus of the pesent invention taken along line 5—5 of FIG. 3.

DETAILED DESCRIPTION OF THE INVENTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

FIG. 1 depicts a preferred configuration wherein an infrared motion sensor 1 serves as a means to switch power from a service mount 7 to the spotlights B relative to infrared activity sensed by sensor 1. The nature of an infrared sensing device requires accurate aiming and therefore a high degree of articulation is needed in a mounting apparatus used with it. Thus in the preferred configuration depicted in FIGS. 1 and 2, two of the rotation limiting ball-joint conduit apparatus of the present invention are utilized, each referenced by 10. As therein depicted, one ball-joint is operably interposed between service mount 7 and a mounting conduit extension 5 and another ball-joint of the present invention is interposed between extension 5 and infrared sensor 1.

FIGS. 2, 3, 4 and 5 disclose the rotation limiting ball-joint conduit apparatus 10 of the present invention generally comprising a ball member 12 received in a socket member 20 for rotational movement of the ball member 12 therein.

As best disclosed in FIGS. 2 and 4, ball member 12 is in the form of a cylinder 16 having opposed ends 15, 17 and a spherical flange 14 formed around the circumference of cylinder 16 at end 15. Cylinder 16 has a passage 18 through its longitudinal axis which is adapted to permit electrical wires, such as A of FIG. 5, to pass through ball member 12 at any angle of adjustment.

Spherical flange 14 has a flat surface 19 formed in the plane of a chord of the spherical flange which is parallel with the longitudinal axis of cylinder 16.

FIG. 3, 4 and 5, disclose that socket member 20 is generally in the form of a C-shaped collar 22 having an inner surface 24, an outer circumferential surface 26 and opposed sides 27 and 28. As better disclosed in FIG. 5, the C-shape of collar 22 terminates in offset ends 30. Offset ends 30 are spaced in parallel alignment.

Inner surface 24 is semi-spherically concave with the diameter of the concave surface being slightly offset toward side 27 of collar 22. Inner surface 24 is dimensioned to receive spherical flange 14 trough side 27 and into collar 22 so as to allow pivotal movement of ball member 12 relative to socket member 20 and to provide substantial sealing contact therebetween.

FIGS. 3, 4 and 5 disclose a steel indexing pin 32 which is cylindrical and has a circumferential flange 36 at one end. Indexing pin 32 is press-fitted into opening 31 of collar 22 leaving flange 36 abutted to and outwardly exposed from inner surface 24. As best disclosed in FIG. 5, flange 36 extends to a point centered above flat surface 19 of spherical flange 14 so that, as ball member 12 is rotated in any given direction flange 36 engages upon a point along the periphery of flat side 19. Thus, the maximum rotation of ball member 12 along any axis is limited to the radial distance between ends of the chord as defined by surface 19 in the plane of that axis less the diameter of flange 36.

In other embodiments indexing pin 32 may be other than a steel pin press-fitted into hole 31 of collar 22, such as a threaded set screw adjustably extending through a threaded hole in collar 22 or it may be made integral with surface 24 through thermoplastic molding or die casting of socket member 20.

FIGS. 4 and 5 disclose that offset ends 30 of collar 22 have a bolt 35 extending through aligned holes 33 in the offset ends. Bolt 35 is threaded into nut 37. As bolt 35 is further threaded into nut 37 offset ends 30 are drawn together thus reducing the diameter of collar 22. Thus, once ball member 12 is received into collar 22, the diameter of collar 22 can be reduced as desired to keep flange 14 therein and to frictionally stabilize attitude positioning of ball member 12. Each hole 33 includes a countersunk external opening 40 to recess the head of bolt 35 and nut 37. As disclosed in FIG. 5, a foam rubber spacer 39 is interposed between offset ends 30 to seal the space between them.

As best disclosed in FIG. 3 and 4, side 28 of collar 22 includes an externally threaded cylindrical flange 34 which extends normal from side 28 and is attached to the general periphery thereof. As better disclosed in FIGS. 1 and 2, the externally threaded flange 34 is adapted to extend through an opening 8 of a service mount 7 and threadedly mate with an internally threaded lock nut 42 on the interior side of opening 8 to secure socket member 20 to the service mount. Flange 34 also allows electrical wires A to pass through the mated flange and opening and into cylinder 16. Also depicted in FIG. 2, threaded flange 34 can be mated to mounting conduit extension 5 by threading into internal threads in end 5a of extension 5.

In the embodiment herein disclosed, socket member 20 is molded from thermoplastic. In other embodiments socket member 20 may be made from other than plastic such as coated metal.

As best disclosed in FIG. 2, cylinder end 17 is attached to an electrical fixture such as infrared motion sensor 1 or to a mounting conduit extension such as 5. In a preferred embodiment, as best disclosed in FIG. 2, a ball member 12 of the present invention is made of thermoplastic and is integrally molded with the plastic housing of fixture 1. Similarly, a ball member 12 is integrally molded with plastic extension 5.

In other embodiments cylinder 16 may incorporate other means to attach end 17 to an electrical fixture or conduit mounting extension, such as having external threads on end 17 or having an attached mounting plate for use with snaps or screws.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. A ball-joint conduit apparatus for the adjustable mounting and electrical connection of an electrical fixture to a desired fixed service mount, comprising:

a cylinder which is adapted to allow passage of electrical wire through its longitudinal axis and which has opposed first and second cylinder ends;

said first cylinder end including integral means for attaching said cylinder to an electrical fixture, said means allowing passage of electrical conductors through it and into said cylinder;

said second cylinder end including a spherical flange extending radially around a circumference of said cylinder end defining a ball member;

said spherical flange having at least one flat exterior surface, said flat surface being formed in the plane of a chord of said spherical flange with said chord being parallel with a longitudinal axis of said cylinder;

a C-shaped collar having an inner surface, an outer circumferential surface, opposed sides and offset ends;

said offset ends being in parallel alignment and having a space between them;

said collar inner surface being semi-spherically concave defining a socket adapted to receive said spherical flange of said cylinder for pivotal movement therein;

means to reduce a diameter of said C-shaped collar once said spherical flange is received therein so that said flange is kept therein and frictionally stabilized once adjusted to a given position;

means to attach said C-shaped collar to a fixed service mount, said means allowing passage of electrical conductors through it and into said cylinder;

an indexing member extending from said collar inner surface to a point centered above said at least one flat surface of said spherical flange;

said indexing member being located so that said indexing member engages only upon a point along a periphery of said flat surface of said spherical flange when said spherical flange is rotated, thus preventing further rotation in that direction.

2. A ball-joint conduit apparatus as defined in claim 1, wherein,
   said means for attaching said first end of said cylinder being integral with a least a portion of said electrical fixture.

3. A ball-joint conduit apparatus as defined in claim 1, wherein an electrical fixture is molded from a thermoplastic material with said cylinder being integral with said electrical fixture as molded.

4. A ball-joint conduit apparatus as defined in claim 2, wherein said means to attach said C-shaped collar to a fixed service mount is in the form of an externally threaded flange;
   said externally threaded flange is formed around the periphery of one said side surface of said C-shaped collar and extends normally therefrom;
   whereby, said externally threaded flange can threadedly mate, with an internally threaded member secured to a fixed service mount and electrical wires can pass through said mated flange and opening into said cylinder.

5. A ball-joint conduit apparatus as defined in claim 2, wherein said means to reduce said diameter of said C-shaped collar is in the form of a bolt and a,nut extending through aligned openings in said offset parallel ends of said C-shaped collar;
   whereby, as the nut and bolt are tightened said offset ends are drawn together thus reducing the diameter of said C-shaped collar.

6. A ball-joint conduit apparatus as defined in claim 2, in which said indexing member is a pin with opposed ends;

one said opposed end has a flange extending radially around a circumference of said pin;

said other opposed end is pressed into an opening located intermediately in said inner surface of said C-shaped collar;

whereby, said flange abuts said inner surface of said C-shaped collar and said flange indexes said periphery of said at least one flat surface of said spherical flange thus limiting said spherical flange rotational movement.

* * * * *

UNITED STATES PATENT AND TRADEMARK OFFICE
CERTIFICATE OF CORRECTION

PATENT NO. : 4,842,308

DATED : June 27, 1989

INVENTOR(S) : James C. Spotts

It is certified that error appears in the above-identified patent and that said Letters Patent is hereby corrected as shown below:

Column 1, line 10, "backoround" should read -- background --

Column 1, line 37, "balljoint" should read -- ball-joint --

Column 2, line 7, "pesent" should read -- present --

Column 2, line 57, "trough" should read -- through --

Column 4, line 43, "a least" should read -- at least --

Column 4, line 49, "2" should read -- 1 --

Column 4, line 61, "2" should read -- 1 --

Column 4, line 63, "a,nut" should read -- a nut --

Column 5, line 1, "2" should read -- 1 --

Signed and Sealed this

Seventeenth Day of March, 1992

Attest:

HARRY F. MANBECK, JR.

*Attesting Officer*  *Commissioner of Patents and Trademarks*